(12) United States Patent
Sodemann et al.

(10) Patent No.: US 7,015,404 B2
(45) Date of Patent: Mar. 21, 2006

(54) DO-IT-YOURSELF SYSTEM FOR PORTABLE GENERATOR

(75) Inventors: Wesley A. Sodemann, Dousman, WI (US); Kenny J. Stair, North Prairie, WI (US); Billy Brandenburg, Horicon, WI (US); Peter J. Nushart, Waukesha, WI (US)

(73) Assignee: Briggs & Stratton Power Products Group, LLC, Jefferson, WI (US)

( * ) Notice: Subject to any disclaimer, the term of this patent is extended or adjusted under 35 U.S.C. 154(b) by 192 days.

(21) Appl. No.: 10/784,370

(22) Filed: Feb. 23, 2004

(65) Prior Publication Data

US 2005/0184527 A1    Aug. 25, 2005

(51) Int. Cl.
*H01R 24/00*    (2006.01)
*H02J 9/04*    (2006.01)

(52) U.S. Cl. ............ 200/51.11; 200/51 R; 200/51.12; 307/64

(58) Field of Classification Search ... 200/51 R–51.12; 307/43, 64, 66, 68, 80, 84, 85, 70, 72, 112, 307/139, 150; 324/508; 361/785; 439/188, 439/214, 652
See application file for complete search history.

(56) References Cited

U.S. PATENT DOCUMENTS

| | | | |
|---|---|---|---|
| 2,229,729 A | 1/1941 | Emde | |
| 2,865,017 A | 12/1958 | Heikes | |
| 2,997,691 A | 8/1961 | Stoll | |
| 3,041,420 A | 6/1962 | Berry et al. | |
| 3,631,324 A | 12/1971 | Jones | |
| 3,641,487 A | 2/1972 | Rogers et al. | |
| 3,647,997 A | 3/1972 | Nerem | |
| 3,936,782 A | 2/1976 | Moakler et al. | |
| 4,013,849 A | 3/1977 | Brown | |
| 4,021,678 A | 5/1977 | Moakler et al. | |
| 4,157,461 A | 6/1979 | Wiktor | |
| 4,297,551 A | 10/1981 | Ronk | |
| 4,423,336 A | 12/1983 | Iverson et al. | |
| 4,672,227 A | 6/1987 | Lagree et al. | |
| 4,760,278 A | 7/1988 | Thomson | |
| 4,946,096 A | 8/1990 | Ballard et al. | |
| 5,208,584 A | 5/1993 | Kaye et al. | |
| 5,397,868 A | 3/1995 | Smith et al. | |
| 5,483,108 A | 1/1996 | Girard et al. | |
| 5,486,664 A | 1/1996 | Lamp et al. | |
| 5,515,235 A | 5/1996 | Stoller | |
| 5,612,596 A | 3/1997 | Wiese | |
| 5,659,305 A | 8/1997 | Rains et al. | |
| 5,761,027 A | 6/1998 | Flegel | |
| 5,894,981 A | 4/1999 | Kelly | |
| 5,898,389 A | 4/1999 | Deese et al. | |
| 5,984,719 A | 11/1999 | Flegel | |
| 6,100,604 A | 8/2000 | Morroni et al. | |
| 6,121,897 A | 9/2000 | Flegel | |
| 6,169,340 B1 * | 1/2001 | Jones | 307/64 |
| 6,172,432 B1 | 1/2001 | Schnackenberg et al. | |
| 6,181,028 B1 | 1/2001 | Kern et al. | |

(Continued)

*Primary Examiner*—Michael A. Friedhofer
(74) *Attorney, Agent, or Firm*—Michael Best & Friedrich, LLP

(57) ABSTRACT

An apparatus that connects generator power, from a generator to a hard-wired load, the load being connected in circuit to a load power switch that switches power to the load. The apparatus includes a connection box, an input connector, and a two-position switch adapted to being connected in circuit with the generator and with a utility source.

20 Claims, 2 Drawing Sheets

U.S. PATENT DOCUMENTS

| | | |
|---|---|---|
| 6,404,168 B1 * | 6/2002 | Shoji .......................... 320/134 |
| 6,420,801 B1 * | 7/2002 | Seefeldt ....................... 307/64 |
| 6,504,268 B1 | 1/2003 | Flegel |
| 6,531,790 B1 | 3/2003 | Panuce et al. |
| 6,608,264 B1 * | 8/2003 | Fouladpour .............. 200/51.03 |
| 6,876,103 B1 * | 4/2005 | Radusewicz et al. ......... 307/64 |
| 6,878,889 B1 * | 4/2005 | Horst et al. .............. 200/51.11 |
| 2002/0017821 A1 | 2/2002 | Panuce et al. |

* cited by examiner

US 7,015,404 B2

DO-IT-YOURSELF SYSTEM FOR PORTABLE GENERATOR

BACKGROUND OF THE INVENTION

The invention generally relates to power distribution. In particular, the invention relates to power distribution from a generator to an appliance.

Residential electrical loads such as furnaces are typically hardwired to an ON-OFF switch box or a load power switch. Unless an automatic transfer switch and a backup power generator are used, supplying electricity to the furnace with a portable generator when there is a power outage is very difficult. When there is no transfer switch and since the portable generator has to be run outdoors, generator extension cords will run from the portable generator to the load via a window or a door.

Standby back up generators are also known. Such standby generators typically use an automatic transfer switch. However, the automatic power switching and the typical standby power generator are very costly, and generally require an electrician to install.

SUMMARY OF THE INVENTION

The invention provides an apparatus that connects power from a generator to a hard-wired load such as a residential furnace or central air conditioner. The load is connected in circuit to a load power switch that switches power to the load. The apparatus includes a connection box that is connected in circuit to the load and to the load power switch. The apparatus also includes an input connector that is interconnected with the connection box to receive power from the generator. The apparatus also includes a two-position switch that is interconnected with the connection box. The two-position switch is connected in circuit with the generator and with a utility source. The two-position switch has a first position that connects the hard-wired load in circuit with the utility source, and has a second position that connects the hard-wired load in circuit with the generator.

The invention also includes a method of connecting generator power to a hard-wired load that has a load power switch, to switch power to the hard-wired load. The method includes the steps of connecting a utility source to a connection box, and receiving the generator power at an input plug at the connection box. The method further includes the steps of electrically-connecting the utility source to the load power switch when a first position of a two-position switch is selected, and electrically-connecting the generator source to the load power switch when a second position of a two-position switch is selected.

In this way, a user of the generator can choose to keep the original load power switch connected to the load, and thus be able to provide only one source of power at a time, or to disconnect power during maintenance. Additionally, using the original load power switch allows the connection box to occupy a relatively small area, and also results in simple wiring within the connection box. A smaller connection box also generally provides flexibility in installation, and is also relatively less expensive to produce. Furthermore, using the original load power switch allows the connection box to use a two-position switch, which is relatively inexpensive.

Other features and advantages of the invention will become apparent to those skilled in the art upon review of the following detailed description, claims, and drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. In addition, the terms "connected" and "coupled" and variations thereof are not restricted to physical or mechanical connections or couplings.

DETAILED DESCRIPTION

Figure 1:
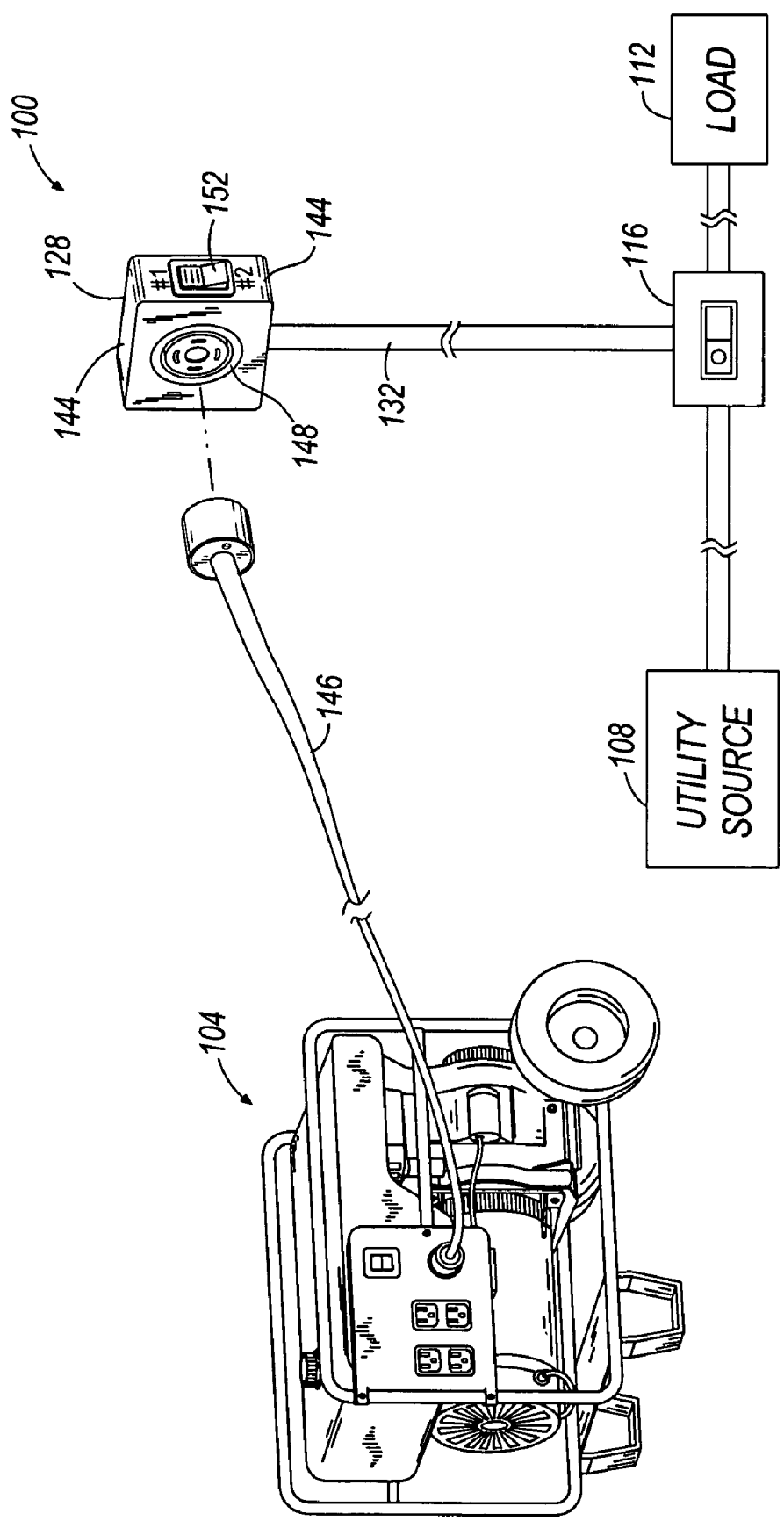
FIG. 1 shows a do-it-yourself ("DIY") system for portable generators according to the present invention.

FIG. 1 shows a do-it-yourself ("DIY") system 100 for portable generators. The DIY system 100 connects power, either from a generator 104 or from a utility source 108 to a hard-wired residential load 112. The load 112 is generally connected in circuit to a load power switch 116 that switches power to the load 112. In other embodiments, the load power switch 116 may be integrated with the load 112.

Typical hard-wired residential loads include furnaces, air conditioning units, and the like. When the load power switch 116 is in an ON position, the load power switch 116 connects a selected power to the load 112. When the load power switch 116 is in an OFF position, the load 112 is disconnected from any power source. In an alternative embodiment, when the load power switch 116 is in the OFF position, the load 112 can be disconnected from the utility power source 108, but connected to the generator 104, detailed hereinafter. In the embodiment shown, the load power switch 116 can be an existing load switch for the load 112.

The DIY system 100 includes a connection box 128, and a power conduit 132. The connection box 128 has a front panel 136, a back 140, and a plurality of side panels 144. The connection box 128 is preferably anchored to a wall at the back 140 of the connection box 128. The front panel 136 has an input plug 148 or other input connector that receives power from the portable generator 104 via a generator power cord 146. Although the input connector 148 is shown disposed on the front panel 136 of the connection box 128, the input connector 148 can also be disposed on one of the side panels 144. The input connector 148 is a male plug, although other connectors can also be used.

In one embodiment, the connection box 128 is mechanically connected to the load power switch 116 via the power conduit 132. The power conduit 132 thus allows the connection box 128 to be placed at any convenient location, or provides a convenient way to at least partially anchor the connection box 128. Although the connection box 128 and the power conduit 132 are shown disposed above and spaced apart from the load power switch 116, the connection box 128 and the power conduit 132 can also be placed at other locations such as below the load power switch 116 depending on the location and the accessibility of the load power switch 116.

The connection box 128 also has a two-position switch 152 on the side panel 144. The two-position switch 152 is connected in circuit with the input connector 148 and thus with the generator 104 in its first position. The two-position switch 152 is connected in circuit with the utility source 108 in its second position. Particularly, when the two-position switch 152 is at the first position, and when the load power switch 116 is in the ON position, generator power is delivered from the generator 104 to the load 112 via the input connector 148. Also, when the two-position switch 152 is at the second position, and when the load power switch 116 remains in the ON position, utility power is delivered from the utility source 108 to the hard-wired load 112.

Figure 2:
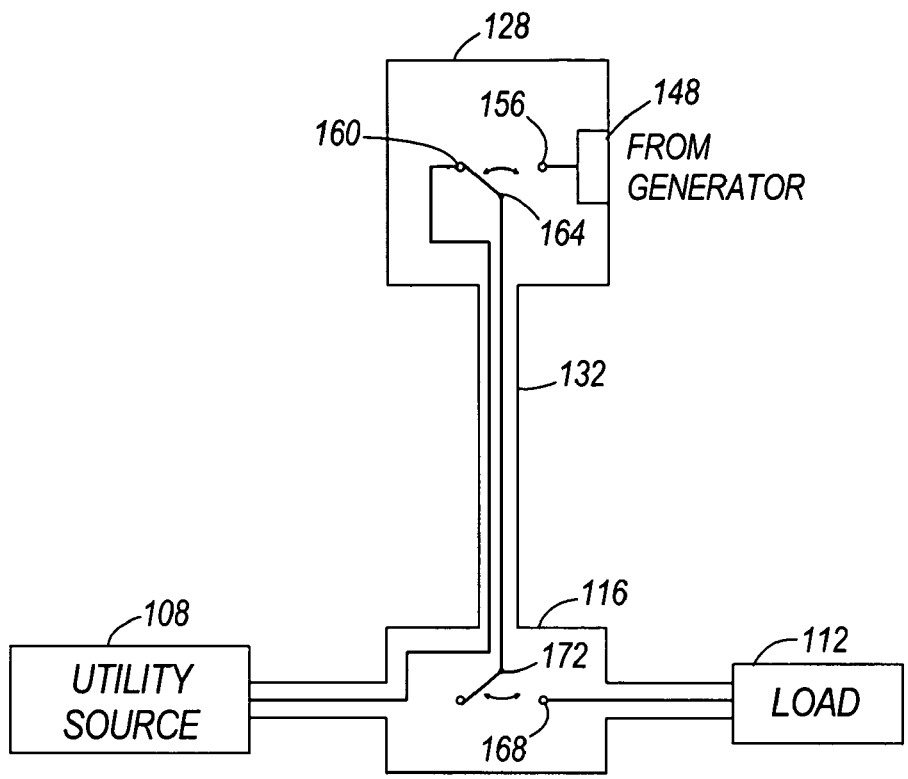
FIG. 2 shows a first electrical circuit according to present invention.

FIG. 2 shows an electrical circuit that may be used with the embodiment in FIG. 1, where like parts are referenced with like numerals. In particular, FIG. 2 shows that the connection box 128, the load power switch 116, and the load 112 are connected and wired in series. FIG. 2 also shows that the connection box 128 receives utility power from the utility source 108 via the power conduit 132 that mechanically connects the connection box 128 and the load power switch 116.

Furthermore, power from the portable generator 104 is available at a first two-position switch contact 156 of the two-position switch 152 via the input connector 148, whereas power from the utility source 108 is available at a second two-position switch contact 160. Specifically, when the first position of the two-position switch 152 is selected, a connection is made between the first two-position contact 156 and a first throw 164. When the ON position of the load power switch 116 is selected, a second connection is also made between an ON contact 168 and a second throw 172, which is also connected to the first throw 164. As a result, the portable generator 104 is connected to the load 112 in series. Similarly, when the second position of the two-position switch 152 is selected, a third connection is made at the two-position switch 152 between the second two-position contact 160 and the first throw 164. Selecting the ON position of the load power switch 116, which makes the second connection at the two-position switch 152, will connect the utility source 108 and the load 112 in series.

Figure 3:
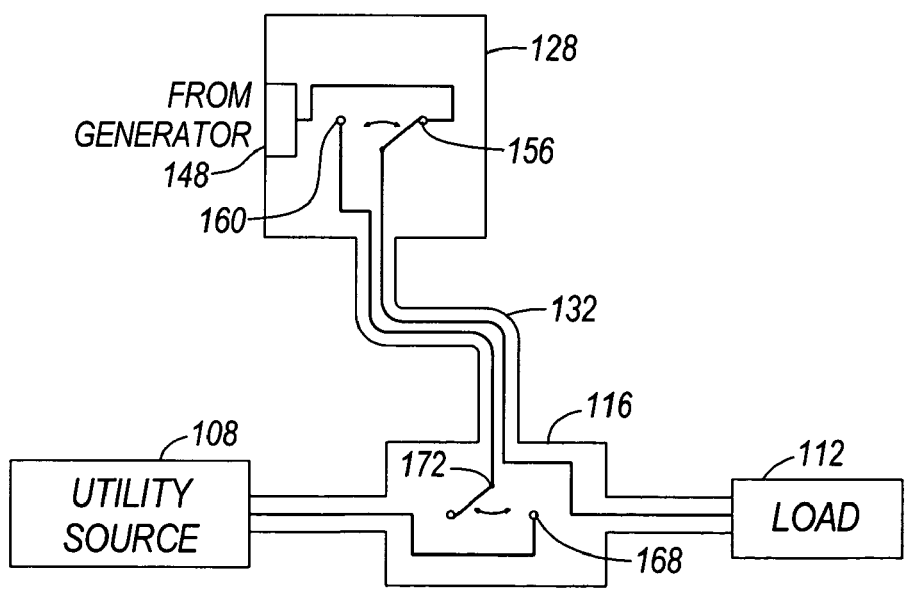
FIG. 3 shows a second electrical circuit according to present invention.

In an alternate circuit shown in FIG. 3, the connection box 128, the load power switch 116, and the load 112 are wired or connected differently. In embodiment shown in FIG. 3, switching the load power switch 116 and the connection box 128 will result in different electrical connections, and provide installation and usage flexibility. For example, FIG. 3 shows that power from the utility source 108 is available at the ON contact 168 of the load power switch 116. Power from the portable generator 104 is shown available at the first two-position switch contact 156 of the two-position switch 152 via the input connector 148. Furthermore, power from the utility source 108 is available at the second two-position switch contact 160 via the second throw 172.

With the wiring arrangement shown in FIG. 3, when the ON position of the load power switch 116 is selected, power from the utility source 108 is provided to the two-position switch 152 as an optional power. In this way, selecting a position on the two-position switch 152 will connect power from either the portable generator 104 or the utility source 108 to the load 112. However, when the OFF position is selected, and if the portable generator 104 is connected to the connection box 128 via the input connector 148, power from the generator 104 can still be provided to the load 112. The OFF position on the load power switch 112 therefore indicates power from the utility source has been disconnected. However, the power from the generator 104 may still be present at the load 112, whereas the ON position simply indicates one of the two power sources has been connected to the load 112.

Referring back to FIG. 2, the present invention also provides a method of connecting generator power to the hard-wired load 112, such as a furnace or an air conditioning unit. When the load 112 has a load power switch 116 that switches power to the hard-wired load 112, the load power switch 116 is first rewired and connected as described hereinafter. The method involves connecting the utility source 108 to the connection box 128, and receiving power from the generator 104 at the input plug or connector 148 of the connection box 128. In this way, the utility source 108 is connected to the connection box 128 at the second two-position switch contact 160 of the two-position switch 152 in circuit through the power conduit 132. After the generator 104 has been connected to the connection box 128 at the input connector 148 on the front panel 136 of the connection box 128, the generator 104 is connected to the connection box 128 at the first two-position contact 156. Thus, power from one of the two power sources 104, 108 is routed back to the load power switch 116 via the power conduit 132.

The method also includes electrically connecting the utility source 108 to the load power switch 116 when the second position of the two-position switch 152 is selected, or electrically connecting the generator 104 to the load power switch 116 when the first position of the two-position switch 152 is selected. That is, when the second position of the two-position switch 152 is selected, the utility source 108 is electrically connected to the load power switch 116 via the second two-position switch contact 160. On the other hand, when the first position of the two-position switch 152 is selected, the generator 104 is electrically connected to the load power switch 116 via the first two-position switch contact 156.

Depending on the position of the load power switch 116, and the position of the two-position switch 152 on the side panel 144 of the connection box 128, power from the generator 104 or from the utility source 108 is either delivered to the load 112 or disconnected. For example, switching the load power switch 116 to an OFF position will electrically disconnect any power to the load 112. Otherwise, switching the load power switch 116 to an ON position will electrically connect power from either the utility source 108 or the generator 104 to the hard-wired load 112. If the embodiment of FIG. 2 is used and the load power switch 116 is in its ON position, selecting the first position 156 and the second position 160 of the two-position switch 152 will electrically connect the generator 104 or the utility source 108 to the load 112, respectively. Similarly, if the embodiment of FIG. 3 is used and the load power switch 116 is in its ON position, selecting the first position and the second position of the two-position switch 128 will electrically connect the generator 104 or the utility source 108 to the load 112, respectively. However, if the embodiment of FIG. 3 is used but the load power switch 116 is in its OFF position, only selecting the first position of the two-position switch 152 will electrically connect any power source to the load 112.

The method also allows for providing a conduit 132 that mechanically connects the connection box 128 and the load power switch 116, and for receiving power from the utility source 108 at the connection box 128 via the conduit 132. The power conduit 132 thus allows the connection box 128 to be placed at any convenient location, for example. Furthermore, positioning the two-position switch 152 on one of the side panels 144 of the connection box 128, for example, allows the connection box 128 to occupy a relatively smaller area, and also provides flexibility in installation. The method also allows for positioning the input plug or connector 148 on the front panel 136 of the connection box 128 to provide easy generator access.

Various features and advantages of the invention are set forth in the following claims.

The invention claimed is:

1. An apparatus that connects generator power, from a generator to a hard-wired load, the load being connected in circuit to a load power switch that switches power to the load, the apparatus comprising:
   a connection box, connectable in circuit to the load and to the load power switch;
   an input connector interconnected with the connection box able to receive power from the generator; and
   a two-position switch interconnected with the connection box, and adapted to be connected in circuit with the generator and with a utility source, the two position switch having a first position connecting the hard-wired load in circuit with the utility source, and having a second position connecting the hard-wired load in circuit with the generator.

2. The apparatus of claim 1, wherein the connection box further comprises a side panel, and wherein the two-position switch is disposed on the side panel.

3. The apparatus of claim 1, further comprises a power conduit mechanically connecting the connection box to the load power switch.

4. The apparatus of claim 1, wherein the hard-wired load comprises a furnace.

5. The apparatus of claim 1, wherein the connection box is mechanically interconnected with the load power switch.

6. The apparatus of claim 1, wherein the input connector is disposed on a front panel of the connection box.

7. The apparatus of claim 1, wherein the input connector is a male plug.

8. An apparatus to electrically connect utility and generator power to a load power switch, the apparatus comprising:
   a connection box being spaced apart from the load power switch;
   a conduit connecting the connection box to the load power switch, the connection box able to receive utility power from a utility source via the conduit;
   an input plug interconnected with the connection box able to receive generator power from a generator; and
   a two-position switch interconnected with the connection box, having a first position electrically-connecting the generator to the load power switch, and having a second position electrically-connecting the utility source to the load power switch.

9. The apparatus of claim 8, and wherein the connection box comprises a front panel, and wherein the input plug is interconnected with the front panel.

10. The apparatus of claim 8, and wherein the connection box comprises a front panel and a side panel and wherein the two-position switch is positioned on the side panel.

11. The apparatus of claim 8, wherein the load power switch electrically switches power to a hard-wired load.

12. The apparatus of claim 11, and wherein the hard-wired load comprises a furnace.

13. The apparatus of claim 8, wherein the input connector is a male plug.

14. A method of connecting generator power to a hard-wired load, the load having a load power switch that switches power to the hard-wired load, the method comprising:
   connecting a utility source to a connection box;
   receiving the generator power at an input plug at the connection box;
   electrically-connecting the utility source to the load power switch when a first position of a two-position switch is selected; and
   electrically-connecting the generator source to the load power switch when a second position of a two-position switch is selected.

15. The method of claim 14, further comprising electrically-disconnecting power to the hard-wired load when the load power switch is in an OFF position.

16. The method of claim 14, further comprising electrically-connecting power from either the utility source or the generator source to the hard-wired load when the load power switch is in an ON position.

17. The method of claim 14, further comprising positioning the two-position switch on a side panel of the connection box.

18. The method of claim 14, further comprising positioning the input plug on a front panel of the connection box.

19. The method of claim 14, and wherein the hard-wired load comprises a furnace.

20. The method of claim 14, further comprising:
   providing a conduit that mechanically connects the connection box and the load power switch; and
   receiving utility power from the utility source at the connection box via the conduit.

* * * * *